June 6, 1939.    I. JACOBSON    2,161,355
SHUTTER AND FLASH SYNCHRONIZER FOR CAMERAS
Filed April 13, 1937
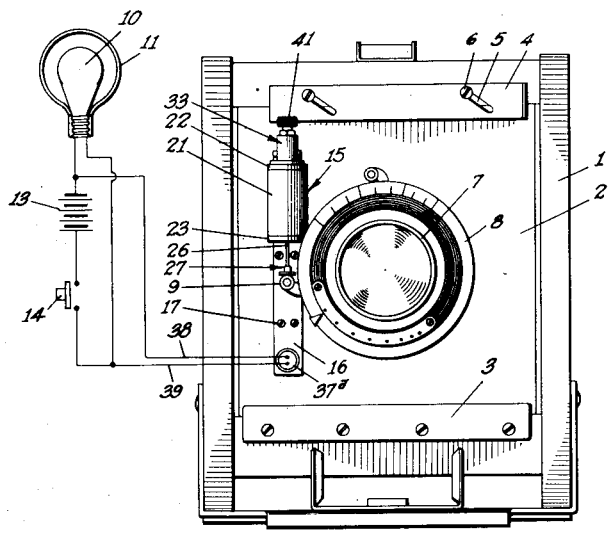
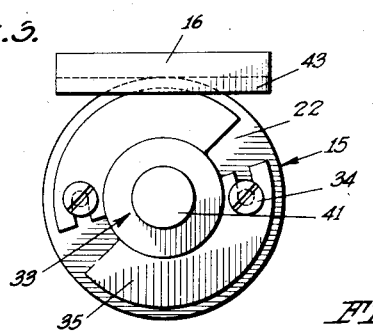
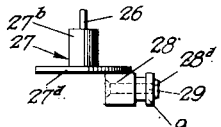
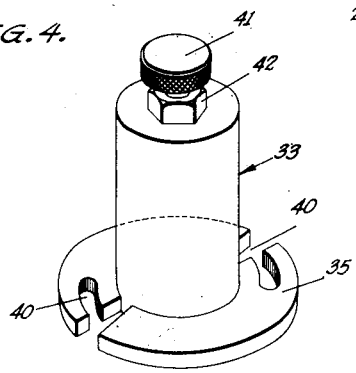
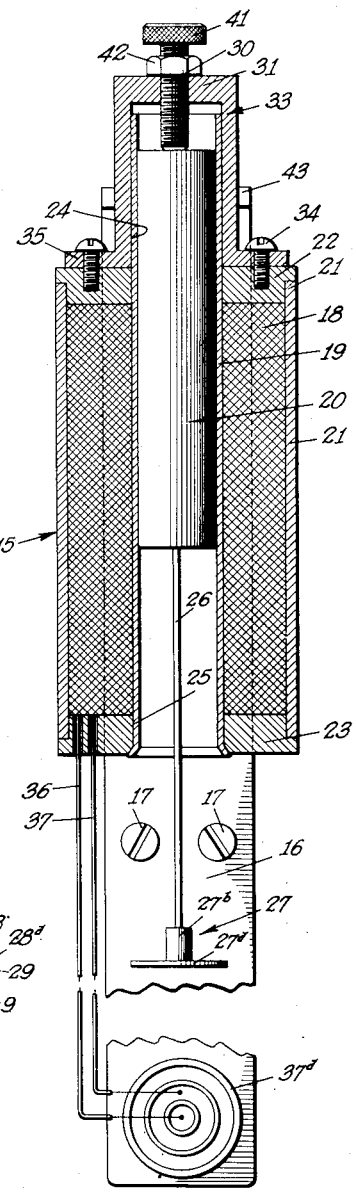
INVENTOR
IRVING JACOBSON
BY Harold W Mattingly
ATTORNEY.

Patented June 6, 1939

2,161,355

UNITED STATES PATENT OFFICE 2,161,355

SHUTTER AND FLASH SYNCHRONIZER FOR CAMERAS

Irving Jacobson, Burbank, Calif.

Application April 13, 1937, Serial No. 136,570

16 Claims. (Cl. 95—53)

My invention relates to devices for synchronizing the operation of the shutter of a camera with the firing of a flash lamp, and has particular reference to a device of this character which, when placed upon the camera, will insure the opening of the shutter at the instant of maximum brilliancy of the flash lamp.

In making flash light photographs, it is common practice to employ an electrically fired flash lamp, usually constructed as a glass envelope having a base thereon adapted to be received in a socket providing electrical connection with the firing elements contained within the flash lamp. The maximum brilliancy or light intensity of the flash lamp is attained at a substantial time lag after current is supplied to the firing elements of the flash lamp and it is at this instant of maximum brilliancy that the shutter of the camera should be opened in order that the maximum light intensity should register on the film.

In order to synchronize the opening of the shutter with the attainment of the maximum intensity of the flash lamp, various devices have been suggested for automatically opening the shutter at the desired instant. However, all of the devices previously employed for this purpose have been cumbersome or have been of such nature as to require removal of the timing devices whenever the shutter is to be operated by hand.

It is therefore an object of my invention to provide a timing device of the character described which will be electrically operated by the same control switch which controls the supply of current to the firing elements of the flash lamp, and which timing device may be compact.

Another object of my invention is to provide a timing device of the character set forth wherein the device may be permanently connected to the shutter-operating mechanism without interference with the operation of the shutter by hand when desired.

Another object of my invention is to provide a timing device of the character set forth wherein the timing device may be constructed as a relatively small unit permanently secured to the lens board of the camera and permanently connected to the shutter trigger of the camera, with adjusting devices permitting the accurate synchronization of the operation of the shutter with the achievement of maximum light intensity of the flash lamp.

Another object of my invention is to provide a timing device of the character set forth in the preceding paragraph wherein the connection and adjustment of the timing device with the shutter trigger is such that the shutter trigger is moved partially toward its shutter-operating position to achieve synchronization of the shutter operation and the flash lamp, and wherein the shutter trigger may be moved back to its fullest extent when hand operation of the shutter trigger is desired, without destroying the accurate adjustment setting of the timing mechanism relative to the shutter trigger.

Other objects of my invention will be apparent from a study of the following specifications, read in connection with the accompanying drawing, wherein Fig. 1 is a front elevational view of the lens board of a camera with my timing mechanism attached thereto and including a diagrammatic showing of the electrical connections of a flash lamp with my timing mechanism;

Fig. 2 is an enlarged vertical sectional view of the timing device illustrated in Fig. 1;

Fig. 3 is a top plan view of the timing device shown in Fig. 2; and

Fig. 4 is a detail perspective view of a cap which may be employed with the timing device shown in Fig. 2 to achieve the desired adjustment of the timing device.

Fig. 5 is a fragmentary view of a shoe and roller construction which may be employed in the practice of my invention.

Referring to the drawing, I have illustrated in Fig. 1 the front end of a camera which includes a frame 1 constituting the mounting means upon which is secured a lens board 2, the lens board being secured to the frame as by means of a step 3 engaging the lower end of the lens board and a movable slide 4 engaging the upper end of the lens board. This construction of the lens board and its mounting is common in camera constructions, the lens board being removed from the camera by sliding the movable slide 4 to the left, as viewed in Fig. 1, whereupon the slide 4 will be lifted upwardly by reason of the angular slots 5 therein engaging screws 6 on the frame 1. It is the usual practice to remove the lens board bodily from the camera whenever it is desired to change the lenses on the camera.

The lens carrier 7 is mounted upon the lens board 2, the lens carrier also constituting the mounting means for a shutter 8 which may be of any desired construction. As will be understood by those skilled in the art, the shutter 8 may be any of the standard constructions, each of which contains mechanism for opening and closing the shutter of the camera whenever the shutter-operating trigger 9 is actuated. The shutter mechanism 8 also includes suitable adjusting devices which permit adjustment and change of speed of opening and closing of the shutter and usually includes what is known as "time" operation and "bulb" operation thereof.

When employing such camera for flash light photography with the electrically fired flash lamps the flash lamp illustrated diagrammatically at 10 surrounded by a reflector 11 is usually received in a case (not shown) containing suitable electric battery cells illustrated diagrammatically at 13 and including also a push button switch 14 by which the circuit from the battery 13 may be completed to the flash lamp 10.

To time the operation of the flash lamp 10 with the operation of the shutter 8, I provide an electromagnetically operated timing device 15 adapted to be permanently mounted upon the lens board 2.

The timing device 15 includes a base 16 which may be constructed from a strip of suitable metal or as a casting comprising an elongated bracket adapted to be secured flat against the lens board 2 as by means of screws 17. Near the upper end of the base 16 I mount a solenoid which preferably comprises an elongated electromagnetic coil 18 surrounding a non-magnetic guide tube 19, which defines a slide bearing for a free plunger 20 of magnetic material.

The dimensions of the coil 18 and plunger 20 may be selected in any desired manner though I have successfully constructed mechanisms of this character for operating the ordinary well known types of shutters with the coil having an external diameter not exceeding ½ inch and having a plunger operating therewithin having a diameter of less than ¼ inch, the coil having a length of between one inch and 1½ inches.

The coil 18 is preferably surrounded by an outer tubular case 21, the ends of which may be closed by end washers 22 and 23, which may be secured to the case by a friction fit or may be welded or otherwise secured in place. The washers 22 and 23 have central bores 24 and 25 extending therethrough, snugly fitting the guide tube 19 to hold the guide tube in place therein.

The lower end of the plunger 20 has secured thereto a wire 26 by which the movement of the plunger may be transmitted to the trigger 9 of the shutter. The lower end of the wire 26 is preferably provided with a shoe 27 which may be constructed as a circular disc 27a, from the center of which projects a boss 27b to receive the end of the wire 26. The location of the coil and plunger relative to the trigger 9 is such that the lower face of the shoe 27 will engage immediately above the trigger 9 and the trigger 9 may be provided with a roller 28 projecting rearwardly of the trigger 9 and secured thereto as by means of a screw or rivet 28a extending through the ordinary hole 29 found in the triggers of camera shutters. The ordinary shutter trigger 9 is provided with a spring returning the same to its normal or uppermost position and it will therefore be noted that this spring is depended upon to return the plunger 20 to its uppermost position after each operation.

In order to accurately time the operation of the shutter trigger 9 with the attainment of maximum brilliancy of the flash light 10, I adjust the normal or uppermost position of the plunger 20 by means of an adjusting screw 30 which is preferably threaded into the upper end 31 of a cap 33 attached to the upper end of the coil structure as by screws or rivets 34 in the upper washer 22, the heads of which screws will extend slightly above the surface of the washer 22 to provide a space therebetween into which a radially extending flange 35 on the cap 33 may be received.

As will be apparent to those skilled in the art, supplying electrical current to the coil 18 will cause the coil 18 to draw the plunger 20 downwardly until the plunger 20 is approximately centrally located within the coil 18. It will also be apparent to those skilled in the art that there will be some appreciable time lag between the instant of the energization of the coil 18 and the arrival of the plunger 20 in its lowermost position. Also there will be some appreciable time lag between the operation of the push button switch 14 and the attainment of maximum brilliancy of the flash lamp 10.

I synchronize the arrival of the plunger 20 in its lowermost position with the attainment of maximum brilliancy of the lamp 10 by connecting the coil 18 to the battery 13 to be controlled by the same push button switch 14 as is used to fire the lamp 10 so that upon the closing of the switch 14 current will be supplied from the battery 13 to the coil 18 and to the flash lamp 10 simultaneously. The connection between the coil 18 and the battery 13 and switch 14 is illustrated diagrammatically in Figs. 1 and 2 as including the connection of the lead-in wires 36 and 37 of the coil 18 to a suitable plug and socket connection 37a (commonly employed in connecting electrical shutter operators with flash lamps), from which plug connection 37a suitable wires 38 and 39 extend to the circuit for the flash lamp 10, connecting with the circuit in parallel or multiple relation with the flash lamp 10, as shown in Fig. 1.

In order to properly adjust the time of the arrival of the plunger 20 at its lowermost position with the attainment of maximum brilliancy of the lamp 10, I employ any of the well known synchronizing testing devices and adjust the screw 30 downwardly to fix the uppermost position of the plunger 20 at such level that upon the closing of the switch 14 the plunger 20 will open the camera shutter at exactly the instant the flash lamp 10 attains maximum brilliancy. In making this adjustment it will be apparent that the downward adjustment of the plunger 20 will partially operate the shutter trigger 9 toward its lowermost position so that the amount of travel of the shutter trigger 9 when the coil 18 is energized is considerably less than the normal distance of travel of the shutter trigger when the same is operated by hand.

Now when the shutter is adjusted to "time" or "bulb" operation, it is necessary that the trigger 9 be permitted to return to its full uppermost position. This operation would normally require the disconnection of the plunger wire 26 from the shutter trigger 9 or would require the destruction of the accurate adjustment of the position of the plunger 20 so that when again synchronous operation of the shutter and flash light was desired it would be necessary to again laboriously readjust the screw 30.

I avoid the necessity for such disconnection, however, by arranging the cap 33, which carries the screw 30, to be bodily removed from the timing device 15 or to be raised upwardly to such position as will allow the plunger 20 to be moved upwardly beyond its normal adjusted position when the shutter trigger 9 is to be moved to its uppermost position as for "time" or "bulb" exposures. This may be readily accomplished by providing bayonet slots 40 in the flange 35 of the cap 33 which allows this cap to be partially rotated and then lifted from engagement with the screws or rivets 34. By making the cap of relatively light material, this cap may be merely left free in this loose position and the spring on the shutter trigger will raise the same by whatever amount is necessary to allow the shutter trigger to return to its uppermost position.

Now, however, when it is desired to again establish synchronous operation of the shutter and flash lamp, all that is required is that the cap 33 be pressed downwardly and partially rotated to reengage the screw or rivet heads 34 above the flange 35. It will be apparent that when the cap is restored to this position, the plunger 20 is again restored to its accurately adjusted position for which the screw 30 has been previously accurately adjusted.

The screw 30 may be readily adjusted as by providing a knurled head 41 thereon permitting the same to be readily operated by hand and a lock nut 42 may be provided on the screw 30 to be screwed tightly down against the top of the cap 33 when the screw has been moved to its adjusted position to thus maintain the screw in this position.

It will be noted therefore from an inspection of Fig. 2 that the upper end of the guide tube 19 extends upwardly into the cap 33 and hence will act as a guide for the lifting and lowering operation of the cap 33. Also if desired the upper end of the base plate 16 may be bent forwardly as indicated at 43 to extend slightly over the flange 35 of the cap and thus prevent its complete removal from the timing device 15. It will also be noted that the shell or casing 21 of the coil 18 may be welded or otherwise secured to the base 16 to support the same thereon.

It will therefore be observed that I have provided a timing device for synchronizing the operation of a shutter and flash light which may be permanently connected to the shutter trigger of the shutter mechanism of the camera without interfering in any way with the normal operation of the shutter trigger by hand for snap-shots, "bulb" or "time" shots, and in which the device may be accurately adjusted to achieve the desired synchronization, which adjustment will not be changed or altered when hand operation of the shutter trigger is required.

It will also be noted that by employing the freely flowing plunger 20 operating within the coil 18, the energization of the coil will cause the plunger to move downwardly until it is centrally located within the coil and this position of the plunger constitutes the lowermost position to which the plunger may move. Should the plunger, due to its inertia, tend to over-ride this position, the effect of the energization of the coil will be to automatically "brake" the over-riding of the plunger and prevent the transmission of undue shock to the shutter trigger and to the shutter-operating mechanism.

By making the plunger relatively small, the mass thereof is so reduced that it cannot be inadvertently operated by shaking or jarring of the camera to open the shutter as is possible with other types of electrical shutter operators.

Moreover, the employment of the plunger operating through the coil 18 permits the plunger to be operated with the camera disposed in any angle without alteration or change in the accurate timing of the shutter operation with the firing of the flash lamp.

While I have shown and described the preferred embodiment of my invention, I do not desire to be limited to any of the details of construction shown or described herein, except as defined in the appended claims.

I claim:

1. In combination with a camera shutter having a trigger movable to one position to actuate the shutter and having a spring to return said trigger to another position, a device for actuating said shutter including a solenoid plunger, means connecting said plunger to said trigger, a coil in which said plunger is mounted and which, when energized, draws said plunger in a direction to operate said trigger to actuate the shutter, and means for varying the starting point of the movement of said plunger to regulate the lapse of time between the energization of the coil and the actuation of the shutter.

2. In combination with a camera shutter having a trigger movable to one position to actuate the shutter and having a spring to return said trigger to another position, a device for actuating said shutter including a solenoid plunger, means connecting said plunger to said trigger to support said plunger upon the spring of said trigger whereby said plunger is moved in one direction by said spring, a coil surrounding said plunger and operable, when energized, to move said plunger in one direction against the force of said spring to operate said trigger to actuate said shutter, and adjustable means associated with said plunger and extending into the path of movement of said plunger to vary the starting point of the movement of said plunger to regulate the lapse of time between the energization of the coil and the actuation of the shutter.

3. In combination with a camera shutter having a trigger movable to one position to actuate the shutter and having a spring to return said trigger to another position, a device for actuating said shutter including a solenoid plunger, means connecting said plunger to said trigger to support said plunger upon the spring of said trigger whereby said plunger is moved in one direction by said spring, a coil surrounding said plunger and operable, when energized, to move said plunger in one direction against the force of said spring to actuate said trigger, and adjustable means associated with said plunger and extending into the path of movement of said plunger to adjustably vary the starting point of the movement of said plunger to regulate the lapse of time between the energization of the coil and the actuation of the shutter, and means for moving said adjustable means out of the path of said plunger.

4. In a device for synchronizing the firing of a flash lamp with the operation of a camera shutter, having a shutter trigger movable in one direction to operate the shutter and having a spring to return the trigger in the opposite direction, a flash lamp, a circuit therefor and a switch for controlling said circuit, electro-magnetic means for actuating said trigger including a coil in circuit with said switch, armature means movable by said coil in a direction to operate said trigger to actuate said shutter when said coil is energized, means engageable by said armature means for adjustably varying the starting point of the movement of said armature means toward shutter-actuating position to regulate the lapse of time between the energization of the coil and the actuation of the shutter.

5. In a device for synchronizing the firing of a flash lamp with the operation of a camera shutter, having a shutter trigger movable in one direction to operate the shutter and having a spring to return the trigger in the opposite direction, a flash lamp, a circuit therefor and a switch for controlling said circuit, electro-magnetic means for actuating said trigger including a coil in circuit with said switch, armature means movable by said coil in a direction to operate said trigger to actuate said shutter when said coil is energized, means engageable by said armature means for adjustably varying the starting point of the movement of said armature means toward shutter-operating position to regulate the lapse of time between the energization of the coil and the operation of the shutter, mounting means for said adjusting means and means for detachably securing said mounting means in fixed position relative to the location of said shutter trigger when said trigger is in said shutter-operating position to permit the removal of said adjusting means without disturbing its adjusted position relative to said shutter-operating position of said shutter trigger.

6. In a device for synchronizing the operation of a camera shutter having a trigger for actuating the same movably from a normal position to a shutter-actuating position with the firing of a flash lamp having a circuit and switch connected thereto, an electro-magnetic coil connected in the circuit with said switch, armature means operable by said coil when said coil is energized, means mounting said coil and armature means on a camera, disposing the path of movement of said armature means in the direction of movement of said trigger, means coupling said armature means with the trigger and adjustable means associated with said armature means for adjusting the position of said armature means in the direction of actuating movement of said trigger to normally hold said trigger in an adjusted position intermediate said normal and actuating positions, to regulate the lapse of time between the actuation of said switch and the operation of the shutter.

7. In a device for synchronizing the operation of a camera shutter having a trigger for actuating the same movably from a normal position to a shutter-actuating position with the firing of a flash lamp having a circuit and switch connected thereto, an electro-magnetic coil connected in the circuit with said switch, armature means operable by said coil when said coil is energized, means mounting said coil and armature means on a camera, disposing the path of movement of said armature means in the direction of movement of said trigger, means coupling said armature means with the trigger, adjustable means associated with said armature means for adjusting the position of said armature means in the direction of actuating movement of said trigger to normally hold said trigger in an adjusted position intermediate said normal and actuating positions, to regulate the lapse of time between the actuation of said switch and the operation of the shutter, mounting means for said adjusting means and means for detachably securing said mountaing means in fixed relation to said armature means to permit the removal of said adjusting means without disturbing its adjusted position relative to its mounting.

8. In a device for synchronizing the operation of a camera shutter having a trigger for actuating the same movable from a normal position to a shutter-actuating position with the firing of a flash lamp having a circuit and switch for controlling the same, a solenoid coil connected in circuit with said switch, a plunger operable in said coil, means mounting said solenoid on a camera disposing the path of movement of said plunger in the direction of movement of said trigger, substantially rigid means coupling said plunger with said trigger, means associated with said coil and extending into the path of movement of said plunger to press said plunger in the direction of movement of said trigger to hold said trigger in a position intermediate said normal and actuating positions, and means for moving said last named means out of said path to allow said trigger to return to its full normal position.

9. In a device for synchronizing the operation of a camera shutter having a trigger for actuating the same movable from a normal position to a shutter-actuating position with the firing of a flash lamp having a circuit and switch for controlling the same, a solenoid coil connected in circuit with said switch and having a guide tube extending therethrough, a magnetic plunger operable in said tube, means mounting said coil on said camera to dispose the path of movement of said plunger in the direction of movement of said trigger between its positions, means coupling one end of said plunger to said trigger, and means associated with said coil and engageable with the opposite end of said plunger for pressing said plunger in the direction of movement of said trigger to hold said trigger in an intermediate position for regulating the time lag between the energization of said coil and the actuation of said shutter.

10. In a device for synchronizing the operation of a camera shutter having a trigger for actuating the same movable from a normal position to a shutter-actuating position with the firing of a flash lamp having a circuit and switch for controlling the same, a solenoid coil connected in circuit with said switch and having a guide tube extending therethrough, a magnetic plunger operable in said tube, means mounting said coil on said camera to dispose the path of movement of said plunger in the direction of movement of said trigger between its positions, means coupling one end of said plunger to said trigger for supporting said plunger on said trigger, a cap for said coil and adjustable means on said cap extending into said tube to engage said plunger to adjustably vary the starting point of the movement of said plunger to regulate the lapse of time between the actuation of the switch and the actuation of the shutter.

11. In a device for synchronizing the operation of a camera shutter having a trigger for actuating the same movable from a normal position to a shutter-actuating position with the firing of a flash lamp having a circuit and switch connected thereto, a solenoid coil connected in circuit with said switch, a magnetic plunger operable in said coil, means mounting said coil on said camera to dispose the path of movement of said plunger in the direction of movement of said trigger between its two positions, means coupling one end of said plunger to said trigger, a cap on said coil, adjusting means on said cap extending into the path of movement of said plunger to hold said plunger when said coil is de-energized in a position disposing said trigger between normal and actuating positions, and means detachably securing said cap upon said coil in fixed relation to said trigger whereby said adjusting means may be removed from the path of movement of said plunger without alteration of the adjusted position thereof relative to said cap.

12. In a device for synchronizing the operation of a camera shutter having a trigger for actuating the same movable from a normal position to a shutter-actuating position with the firing of a flash lamp having a circuit and switch connected thereto, a solenoid coil connected in circuit with said switch, a magnetic plunger movable in said coil through a magnetic center thereof, substantially rigid rod means coupling one end of said plunger to said trigger, means mounting said coil on said camera in such location relative to said trigger and relative to the length of said rod means as to dispose the path of movement of said plunger in the direction of movement of said trigger and to dispose the position of said plunger, when the coil is energized and said plunger is in said magnetic center of said coil, such that the trigger will be in an actuating position whereby any tendency of said plunger to move beyond said position will be opposed by said coil.

13. In combination with a flash lamp having a firing circuit and switch for controlling the same and a camera shutter having a trigger for actuating the same movable from a normal position to a shutter-actuating position, a device for synchronizing the firing of said flash lamp and the actuation of said camera shutter, comprising a base plate to be permanently secured to a camera, an electro-magnetic coil connected in said firing circuit and secured in fixed position upon said base plate, armature means associated with said coil and movable by said coil in the direction of movement of said trigger between its two positions, means coupling said armature means to said trigger, adjustable means extending into the path of movement of said armature means to variably limit the starting point of the movement of said armature means to regulate the lapse of time between the actuation of said switch and the actuation of said shutter, mounting means for said adjustable means and means for detachably securing said mounting means in a fixed position relative to said coil whereby said adjustable means may be moved out of the path of said armature without disturbing its adjusted position relative to its mounting means.

14. In combination with a flash lamp having a firing circuit and switch for controlling the same and a camera shutter having a trigger for actuating the same movable from a normal position to a shutter-actuating position, a device for synchronizing the firing of said flash lamp and the actuation of said camera shutter, comprising a base plate to be permanently secured to a camera, a solenoid coil connected in said firing circuit and permanently secured to said base plate, a plunger operable in said coil in the direction of movement of said trigger between its two positions, means coupling said plunger to said trigger, a cap for said coil, an adjusting screw in said cap adjustable in the direction of movement of said plunger to vary the starting point of the movement of said plunger to regulate the lapse of time between the actuation of said switch and the actuation of said shutter, and means for detachably securing said cap in fixed position relative to said coil.

15. In combination with a flash lamp having a firing circuit and switch for controlling the same and a camera shutter having a trigger for actuating the same movable from a normal position to a shutter-actuating position, a device for synchronizing the firing of said flash lamp and the actuation of said camera shutter, comprising a base plate to be permanently secured to a camera, a solenoid coil connected in said firing circuit and permanently secured to said base plate, a plunger operable in said coil in the direction of movement of said trigger between its two positions, means for coupling said plunger to said trigger including a shoe adapted to rest upon said trigger whereby actuation of said switch to energize said coil will cause said shoe to move said trigger to its shutter-actuating position.

16. In combination with a flash lamp having a firing circuit and switch for controlling the same and a camera shutter having a trigger for actuating the same movable from a normal position to a shutter-actuating position, a device for synchronizing the firing of said flash lamp and the actuation of said camera shutter, comprising a base plate to be permanently secured to a camera, a solenoid coil connected in said firing circuit and permanently secured to said base plate, a plunger operable in said coil in the direction of movement of said trigger between its two positions, a roller secured to said trigger, means coupling said plunger to said trigger including a shoe adapted to rest upon said roller, whereby actuation of said switch to energize said coil will cause said plunger to move said trigger to actuating position.

IRVING JACOBSON.